US011265294B2

(12) United States Patent
Wu

(10) Patent No.: US 11,265,294 B2
(45) Date of Patent: Mar. 1, 2022

(54) METHOD FOR SECURE WIFI CALLING CONNECTIVITY OVER MANAGED PUBLIC WLAN ACCESS

(71) Applicant: TELEFONAKTIEBOLAGET LM ERICSSON (PUBL), Stockholm (SE)

(72) Inventor: Changzheng Wu, Shenzhen (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 525 days.

(21) Appl. No.: 15/760,065

(22) PCT Filed: Sep. 15, 2015

(86) PCT No.: PCT/CN2015/089613
§ 371 (c)(1),
(2) Date: Mar. 14, 2018

(87) PCT Pub. No.: WO2017/045123
PCT Pub. Date: Mar. 23, 2017

(65) Prior Publication Data
US 2019/0052603 A1 Feb. 14, 2019

(51) Int. Cl.
*H04L 29/06* (2006.01)
*H04W 12/06* (2021.01)
(Continued)

(52) U.S. Cl.
CPC ........ *H04L 63/0272* (2013.01); *H04L 63/164* (2013.01); *H04L 63/20* (2013.01);
(Continued)

(58) Field of Classification Search
CPC ... H04L 63/0272; H04L 63/164; H04L 63/20; H04L 29/06; H04L 65/1016;
(Continued)

(56) References Cited

U.S. PATENT DOCUMENTS 7,877,461 B1 * 1/2011 Rimmer .............. H04L 63/0823
709/217
8,594,628 B1 11/2013 Schroeder et al.
(Continued)

FOREIGN PATENT DOCUMENTS

CN 101521930 A 9/2009
EP 2071775 A1 6/2009
(Continued)

OTHER PUBLICATIONS

3GPP TS 23.234 V12.0.0, Sep. 2014; 83 pages.
(Continued)

*Primary Examiner* — Jayesh M Jhaveri
(74) *Attorney, Agent, or Firm* — Sage Patent Group

(57) ABSTRACT

Embodiments of the invention relate to methods and apparatus for establishing a secure connectivity for WiFi calling service to the EPC over a trusted or managed WLAN by establishing an IPSec tunnel over the WLAN with a gateway in the EPC (ePDG) through an HTTP server and logging to the HTTP server that may be co-located with the ePDG. The disclosure could enable internet traffic to be routed through the WLAN or through the HTTP server itself while routing WiFi calling service related traffic through the HTTP server and ePDG. The UE authentication used to establish the IPSec tunnel is used as a common authentication for the secure connectivity for WiFi calling service and local routing of internet traffic as permitted.

25 Claims, 10 Drawing Sheets

UE Logging and Attach

(51) Int. Cl.
*H04W 76/12* (2018.01)
*H04L 65/1016* (2022.01)
*H04L 65/1069* (2022.01)
*H04L 65/1059* (2022.01)
*H04W 84/12* (2009.01)

(52) U.S. Cl.
CPC ........ *H04L 63/205* (2013.01); *H04L 65/1016* (2013.01); *H04L 65/1059* (2013.01); *H04L 65/1069* (2013.01); *H04W 12/06* (2013.01); *H04W 76/12* (2018.02); *H04W 84/12* (2013.01)

(58) Field of Classification Search
CPC .. H04L 63/205; H04L 65/1059; H04W 76/12; H04W 84/02; H04W 12/06; H04Q 7/24
USPC .......................................................... 726/3
See application file for complete search history.

(56) References Cited

U.S. PATENT DOCUMENTS

| | | | | |
|---|---|---|---|---|
| 9,686,284 | B2* | 6/2017 | Shah | H04L 63/0884 |
| 10,277,586 | B1* | 4/2019 | Yau | H04L 63/0807 |
| 2005/0201388 | A1* | 9/2005 | Suh | H04W 12/03 370/395.53 |
| 2010/0002660 | A1* | 1/2010 | Grayson | H04W 36/0033 370/338 |
| 2010/0188975 | A1 | 7/2010 | Raleigh | |
| 2011/0032929 | A1* | 2/2011 | Choi | H04M 3/5191 370/352 |
| 2011/0103260 | A1 | 5/2011 | Jeyatharan et al. | |
| 2012/0033610 | A1* | 2/2012 | Ring | G06Q 20/14 370/328 |
| 2012/0204253 | A1 | 8/2012 | Sugimoto et al. | |
| 2013/0265997 | A1* | 10/2013 | Gu | H04W 36/0022 370/338 |
| 2014/0219167 | A1* | 8/2014 | Santhanam | H04W 28/0268 370/328 |
| 2015/0350983 | A1* | 12/2015 | Kwok | H04L 65/1016 370/331 |
| 2017/0055302 | A1* | 2/2017 | Wang | H04W 48/14 |

FOREIGN PATENT DOCUMENTS

| | | |
|---|---|---|
| WO | 2010/108357 A1 | 9/2010 |
| WO | 2015/038911 A1 | 3/2015 |
| WO | 2015/042389 A1 | 3/2015 |

OTHER PUBLICATIONS

3GPP TS 33.402 V12.2.0, Dec. 2013; 55 pages.
Diab W B et al., "VPN analysis and New Perspective for Securing voice over VPN networks", Networking and Services, 2008, ICNS 2008, Fourth International Conference on IEE, Piscataway, NJ, USA, Mar. 16, 2008, pp. 73-78, XP031239278.
Extended European Search Report issued in application No. 15903814.0 dated Mar. 1, 2019, 12 pages.

* cited by examiner

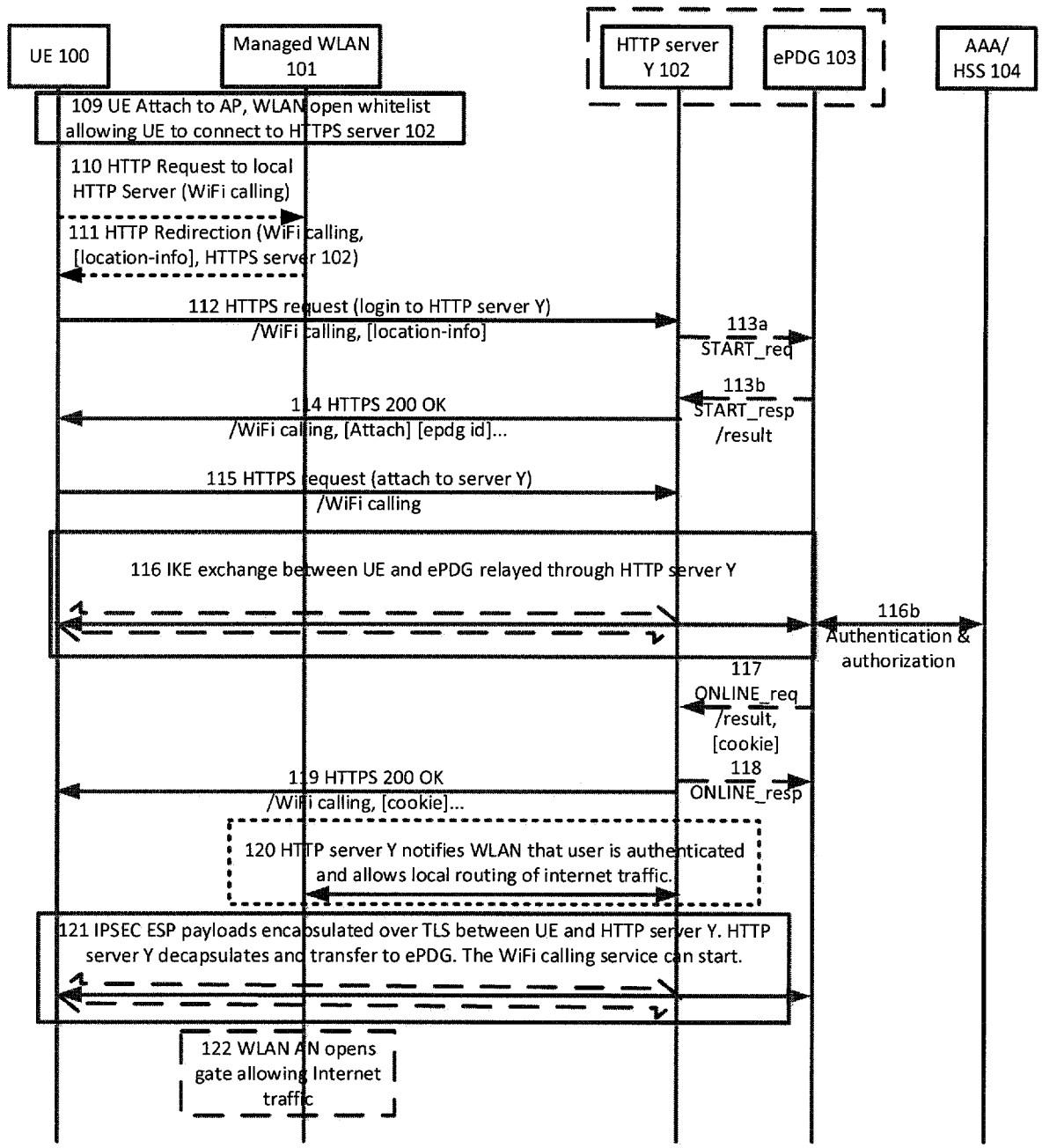
Figure 1 UE Logging and Attach

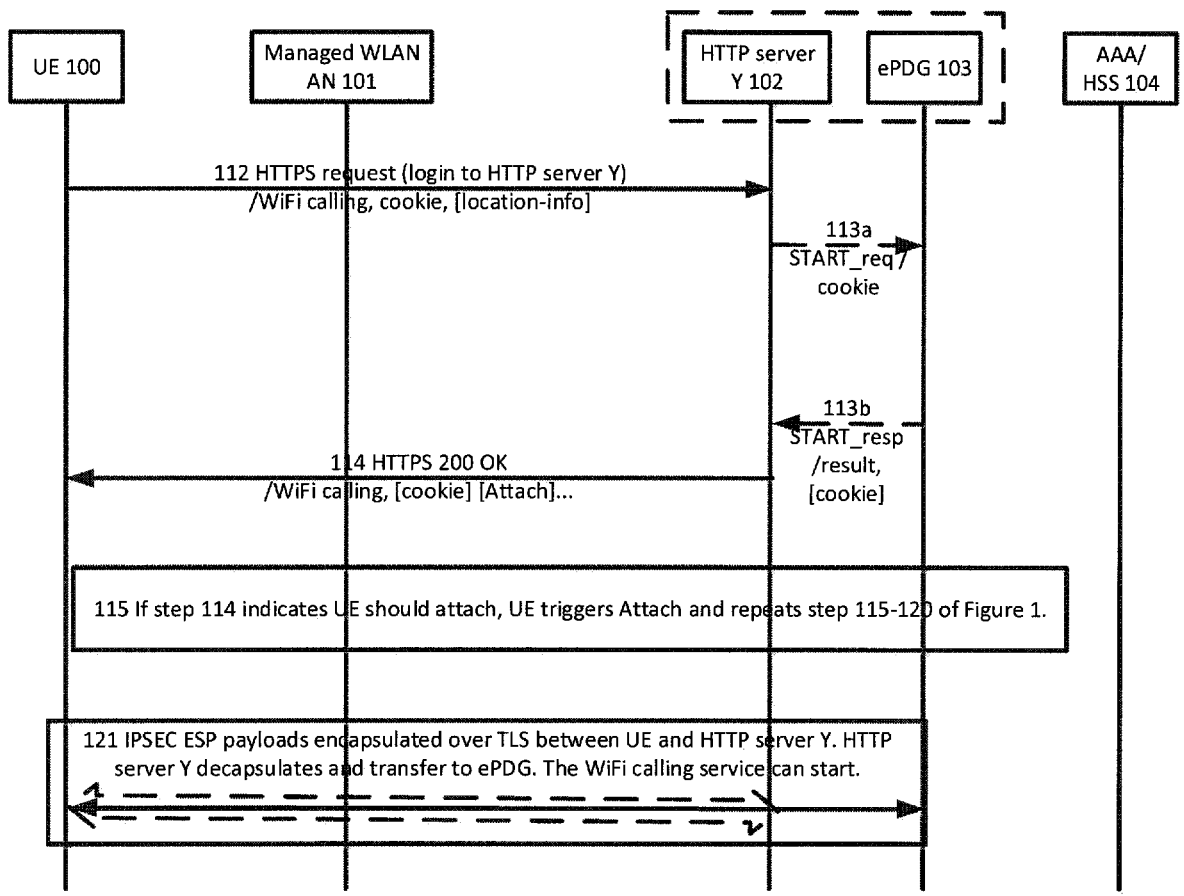
Figure 2 UE Re-login

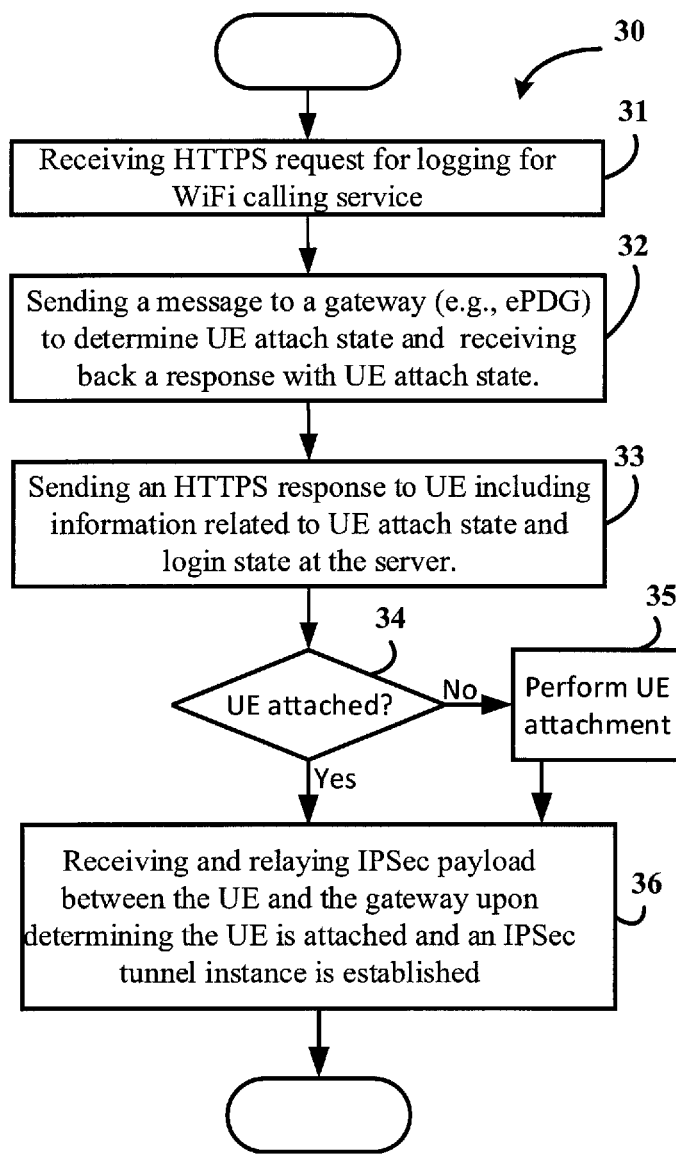
Figure 3 Method at HTTP Server

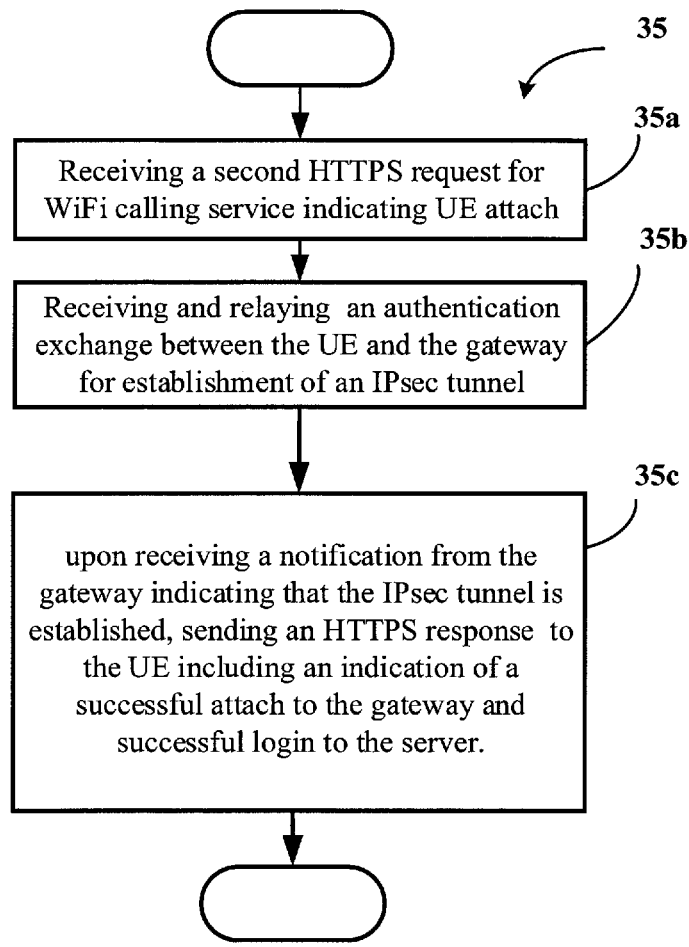
Figure 4 Detailed UE attachment

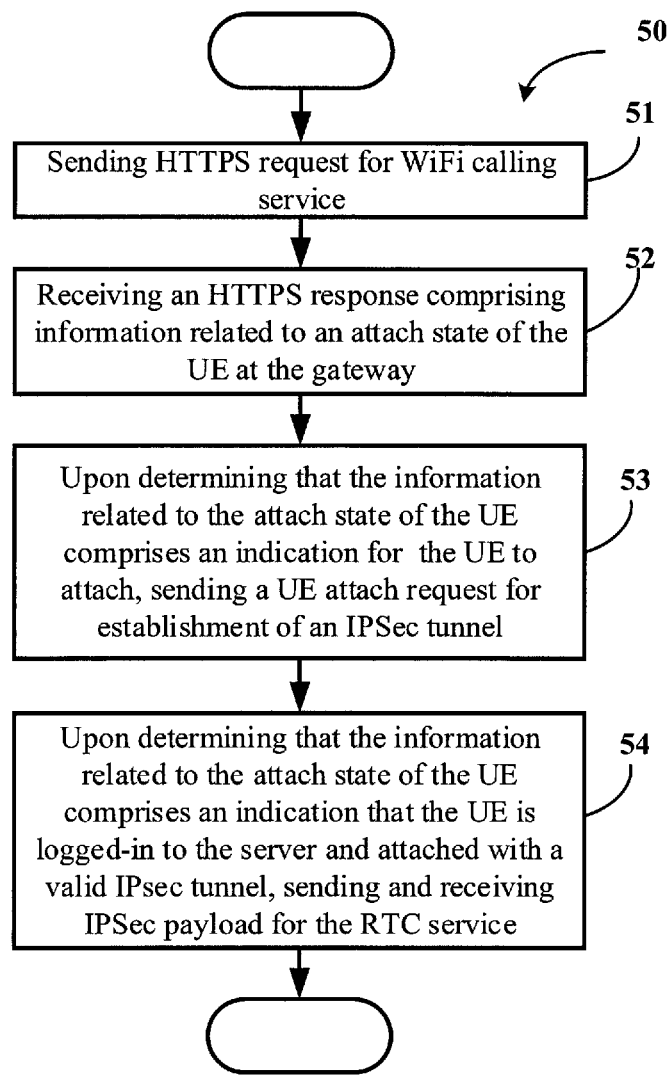
Figure 5 Method in UE

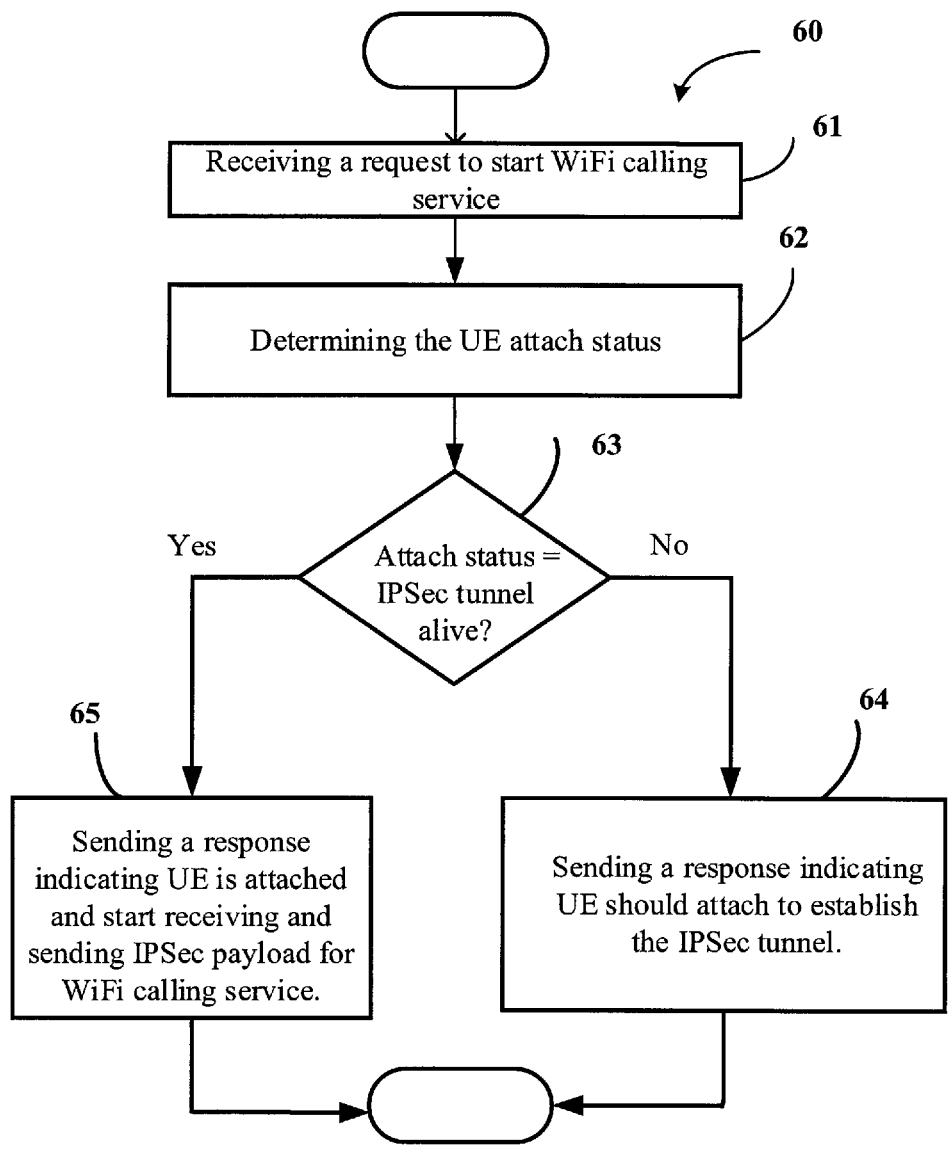
Figure 6 Method at the gateway

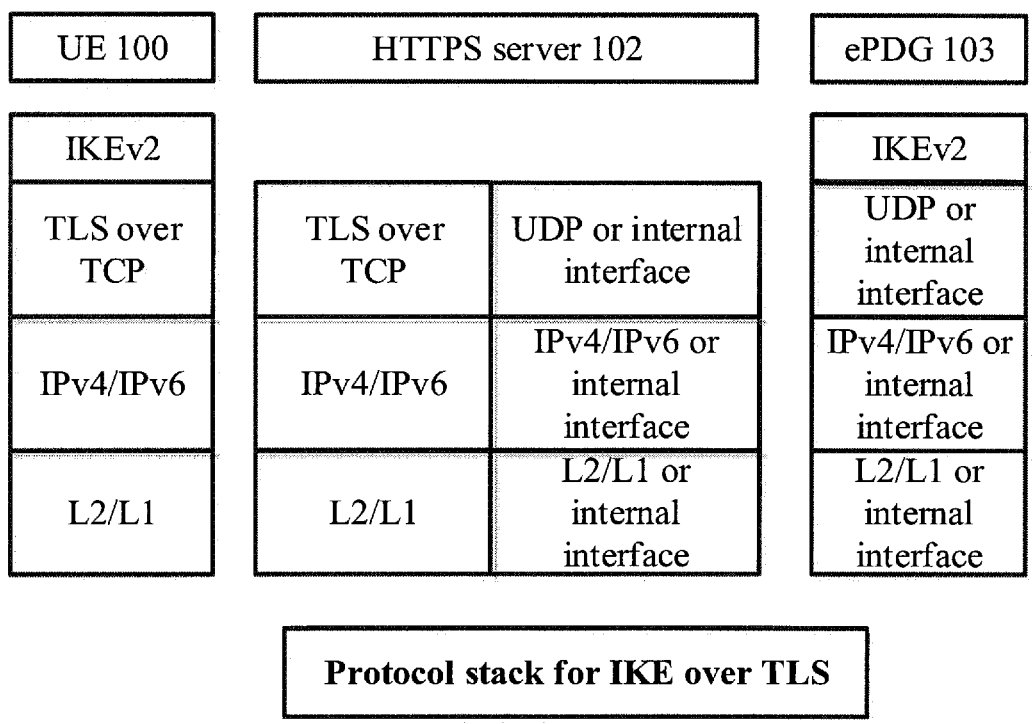
Figure 7 Protocol stack for control signaling

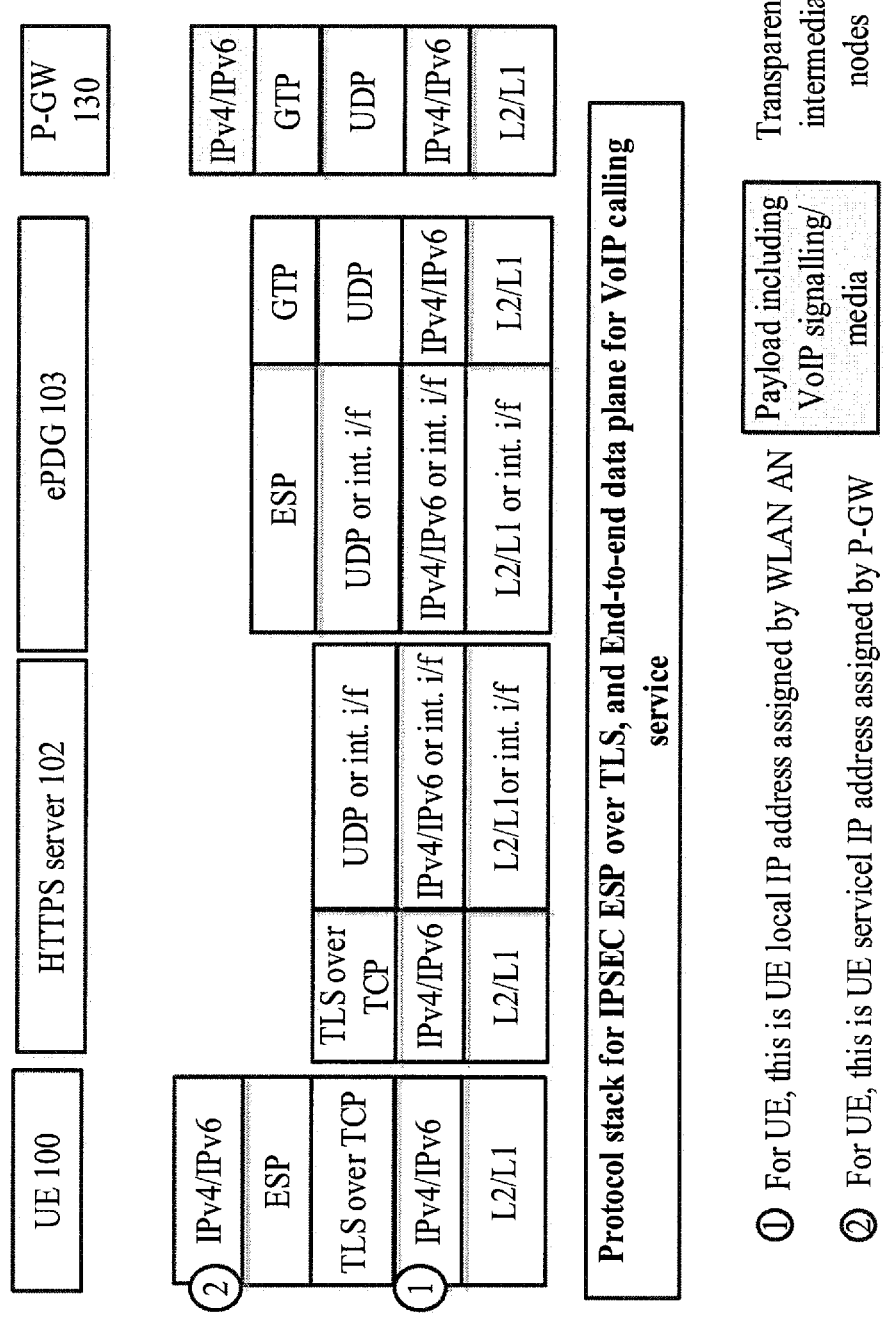
Figure 8 Protocol stack for User Plane

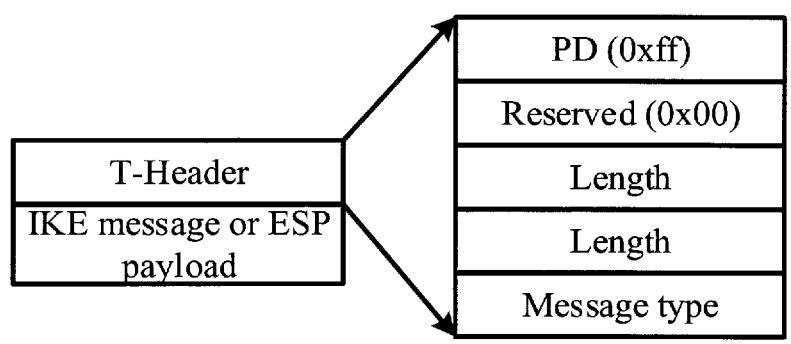
Figure 9. TLS Envelop

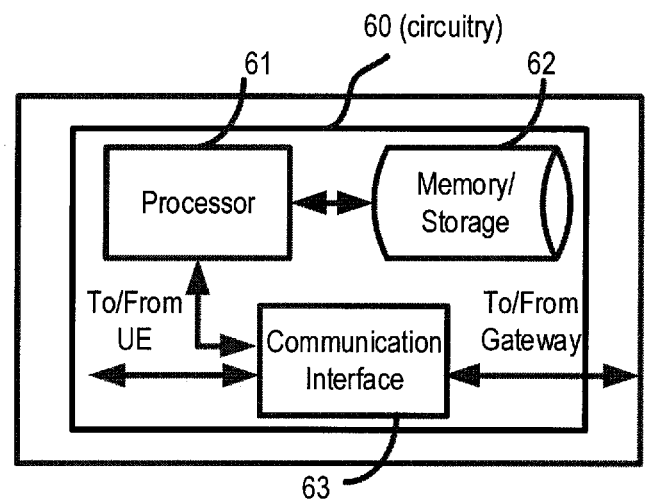
Figure 10 (HTTP Server)
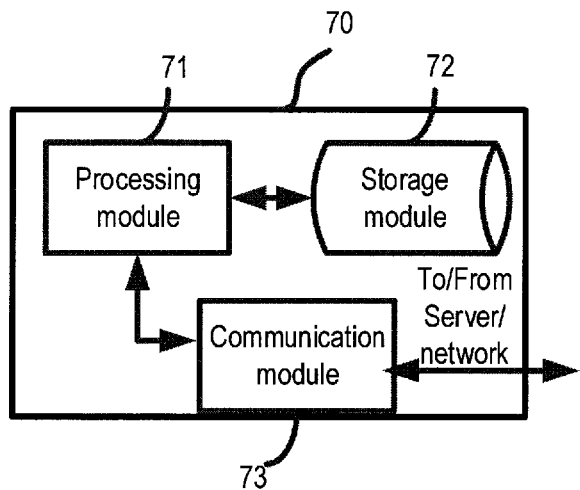
Figure 11. UE

METHOD FOR SECURE WIFI CALLING CONNECTIVITY OVER MANAGED PUBLIC WLAN ACCESS

TECHNICAL FIELD

This disclosure relates generally to establishment of a secure connection over WLAN systems for providing WiFi calling services consisting of real time voice and video services.

BACKGROUND

Wireless Fidelity, WiFi, calling refers to voice and video calls made using WiFi access technology specified in the Institute of Electrical and Electronics Engineers, IEEE, 802.11 standards. One type of WiFi calling service, referred to in this disclosure as over the top, OTT, WiFi calling service, is enabled by OTT applications such as Skype, WhatsApp™, Viber™ and Google Hangouts™ which can be downloaded by users into their user equipment, UE, e.g., tablet or a smartphone. Users use the so-called over the top applications to call other users over the Internet directly from the WiFi network, also referred to as wireless local area network, WLAN, network which may be at home or in public hotspots such as in a café, airport, library, etc. thereby completely bypassing mobile operators' networks. Note that with OTT applications, users have to create a new contact number (different from the user's phone number) to make and receive WiFi calls. Additionally, the users have to create a contact list other than the address book already available in the UE. Sometimes the OTT application can sometimes import the contacts from the UEs native contact list or contacts from the default Electronique mail, Email, account configured in the UE.

To obtain OTT WiFi calling service, a UE may use WiFi access in a WLAN provided by a WLAN access provider, different than a PLMN operator. Typically, when the user is in a public WiFi, or private WiFi in a hotel, airport, etc. the UE gets a local IP address from the WLAN and connects to an HTTP server to authenticate with a username and password. Once authentication is completed, the user is allowed to access the internet and fire up the WiFi calling OTT application.

Another type of Wi-Fi calling, which is referred to in this disclosure as built-in WiFi calling is typically offered by mobile or carrier operators to their users. For example, mobile operators are able to offer access to users who wish to have access to their home services over WiFi networks in hotels, airports, shopping malls and café s, etc. without incurring the same charges that they would otherwise incur if they were to use licensed cellular access. Unlike OTT WiFi calling service, the built-in WiFi calling is integrated into the UE and the user can reuse the same address book, phone number, and dial pad to make and receive calls over WiFi just like he/she is making and receiving calls when using cellular access technology. The user can configure the UE to use built-in WiFi calling service when it loses the cellular signal in which case, the UE could be configured to switch automatically to built-in WiFi calling assuming WiFi coverage is available, or even configure built-in WiFi calling service as default way of making a call.

An architecture for providing a built-in WiFi calling service is described in Group Special Mobile Association, GSMA, Industry Requirements, IR.51, IMS over WiFi in which the UE connects over the WLAN to its mobile operator's Internet Protocol Multimedia Subsystem, IMS, via the Evolved Packet Core, EPC as described in $3^{rd}$ Generation Partnership Project, 3GPP Technical Specification TS 23.402. Mobile operators thus extend the IMS based Voice over LTE, VoLTE and Video over LTE, ViLTE services by including support for WiFi as an access type for both voice and video calls. The built-in WiFi service shares the same IMS client in the UE used for VoLTE and ViLTE over the cellular access enabling reuse of the same address book and the same user credentials for authentication, giving the user experience a seamless experience.

From the mobile operator's perspective, the WiFi access (or WLAN) may be trusted or untrusted. A trusted WiFi access/WLAN is typically deployed by the same mobile operator or by a WLAN provider with whom roaming agreements are in place. The trusted WLAN connects to the packet gateway, PGW in the EPC over the standard interface known as S2a interface as specified, for example, in 3GPP TS 23.402. However, even if the WiFi network belongs to, or is otherwise connected to the mobile operator, the built-in WiFi calling service over the trusted WLAN is not considered by the mobile operator's, secure enough for accessing WiFi calling services in the operator's network. Consequently, to enable the WiFi calling service today, the mobile operator's EPC treats all WLAN accesses as untrusted.

A WiFi access is untrusted by the mobile operator in implementations such as public or private WLAN deployed in cafes, airport, hotels, etc. that are deployed by WLAN providers with whom there are no roaming agreements or service level agreements in place. The UE connects to the EPC by first establishing an Internet Protocol security, IPSec, tunnel to an evolved Packet Data Gateway, ePDG in the EPC. The ePDG acts as a security gateway between the UE and the rest of the EPC. The ePDG tunnels traffic to and from the UE over the established IPSec tunnel. The traffic received from the UE is further tunneled to a PGW in the EPC over the S2b interface as specified in 3GPP TS 23.402, and traffic received from the PGW over the S2b interface is forwarded to the UE over the IP Sec tunnel.

Note that in roaming scenarios the Home Subscriber Server/3GPP Authentication Authorization and Accounting, HSS/3GPP AAA, Server in user's home mobile operator's network determines whether the WiFi Access used by the UE is trusted or untrusted. If the WLAN supports the 3GPP-based access authentication as specified in 3GPP TS 33.402, the UE is further notified during the authentication step in the WLAN. The UE uses the network notification to trigger establishment of an IPSec tunnel with an ePDG if the notification indicates the WLAN is untrusted or to perform native WiFi access if the notification indicates the WLAN is trusted where the UE is not required to establish an IPSec tunnel to access mobile operator's services. Note that if WLAN does not support the 3GPP-based access authentication as specified in 3GPP TS 33.402, the UE determines the trust relationship with the WLAN on the basis of pre-configured policy in the UE by the mobile operator.

To establish a built-in WiFi calling service as specified in GSMA IR.51 over untrusted WLAN, the UE uses the Internet Engineering Task Force, IETF, Internet Key Exchange version 2, IKEv2 protocol, specified in Request For Comment, RFC 5996 and IPSec to establish with the ePDG over the untrusted WLAN a secure connection that is integrity protected and encrypted as per IETF RFC 4301 and IETF RFC 4303. As the WiFi calling service is built-in, the IKEv2 protocol in the UE uses authentication credentials stored on the SIM card to automatically set up the IPSec tunnel between the UE and the ePDG. During the IKEv2 exchange with the UE, the UE and the ePDG are mutually authenticated using an extended authentication protocol method such the authentication key agreement method, EAP-AKA as specified in 3GPP TS 33.402. The ePDG retrieves the security keys, authentication vectors and subscription information from the HSS to authenticate the UE and establish confidentiality of the connection (i.e., session keys for encryption). During the IKEv2 exchange, the ePDG additionally establishes an S2b bearer to a selected PGW in the EPC. The S2b bearer is referred to as a default S2b bearer. The PGW assigns an IP address to the UE. The IP address is used by the UE to send and receive IP traffic to and from the internet or intranet through the PGW and have access to the requested services. 3GPP TS 23.402 refers to the UE to ePDG interface as the SWu interface. Both IKEv2 and IPSec packets are transported over the IP layer and all IMS traffic, whether control or media related packets are encapsulated in an IP Encapsulating Security Payload, ESP as specified in IETF RFC 4303.

Once an IPSec tunnel instance is established between the UE and the ePDG and the UE is assigned an IP address from the PGW, a packet data network, PDN connection is thus established and the UE can start sending IMS control signaling traffic to request session establishment for voice and/or video or both. The ePDG forwards the received traffic to the PGW over the established S2b bearer. A dedicated S2b bearer associated to the same PDN connection may be established in the EPC between the PGW and the ePDG to transport the related media (voice and/or video packets).

The built-in WiFi calling service over IPSec is provided transparently over the WLAN. It is indeed becoming a preferred WiFi calling service choice for operators as it provides the security needed for such services. However functions such as lawful interception, detailed location based charging, location based services, emergency calling are not supported as UE location is required for those functions. Additionally, the current WiFi calling solution results in that all UE traffic whether related to WiFi calling traffic or internet traffic is transported through the operator's network over one or more IPSec tunnel instances.

SUMMARY

The following acronyms are used throughout this disclosure.
  3GPP 3rd Generation Partnership Project
  AAA Authentication Authorization and Accounting
  AC Access Controler
  AKA Authentication and Key Agreement
  BNG Broadband Network Gateway
  EAP Extended Authentication Protocol
  ePDG evolved Packet Data Gateway
  EPC Evolved Packet Core
  ESP Encapsulating Security payload
  GTP GPRS Tunneling Protocol
  HSS Home Subscriber Server
  IKE Internal Key Exchange
  IPSec IP Security
  PDN Packet Data Network
  PGW Packet data Gateway
  S2b The interface between ePDG and PGW
  SWu The interface between UE and ePDG
  UE User Equipment It is an object of the present invention to obviate or mitigate at least one disadvantage of the prior art to enable a UE to connect to a trusted WLAN operated by the mobile operator or a mobile operator partner with whom roaming agreements are in place, and where the UE uses a built-in WiFi calling service by establishing an IPSec tunnel over the trusted WLAN access through an HTTP server while allowing internet traffic to route through the WLAN locally bypassing the mobile operator's network or through the HTTP server. The UE access to WLAN and mobile operator's network is authenticated using a single, common authentication method for both local WLAN access and mobile operator's network access. That authentication method is carried on between the UE and the mobile operator's network when establishing the IPSec tunnel. The mobile operator's network authorizes the WLAN to open the gate for the internet traffic once the IPsec tunnel is established with successful authentication.

In some embodiments, a server which may be co-located with a gateway (e.g., ePDG) in the EPC is configured to receive a secure HyperText Transfer Protocol, HTTPS, request from the UE for logging into the server over the WLAN for real time communication, RTC, services (or WiFi calling services), and where the HTTPS request comprises a real-time communication, RTC, service indicator, which is also an indicator for WiFi calling service. The HTTPS request may include a cookie if the HTTPS request is a re-login attempt, in which case the UE may have received the cookie at initial attach or previous re-attach or re-login. The HTTPS request may also include the UE location information and the local Internet protocol IP address assigned to the UE by the WLAN. Upon receiving the login HTTPS request from the UE, the server sends a message to the gateway (e.g., ePDG) to determine the UE attach state. The server includes the RTC service indicator and may include if received, the local IP address for the UE, the cookie and the UE location information. In response to the message sent to the gateway, the server receives a response indicative of the UE attach state. The server determines the UE attach state which may indicate that the UE is either not attached or should attach for RTC services. It may also indicate if the UE is already attached with a valid IPSec tunnel instance already active. Alternatively, it may indicate that the UE cannot attach if the gateway resources are not available. The server sends an HTTPS response to the UE, where the HTTPS response relates information related to the UE attach state as received from the gateway as well as the login state at the server.

In some embodiments, if the server determined that the UE is already attached for RTC services and that a valid IPSec tunnel instance is active between the UE and the gateway, the server starts receiving and relaying IPSec payload between the UE and the gateway. The IPSec payload received from the UE may be encapsulated in a Transport Layer Security, TLS, envelop, in which case, the server removes the TLS encapsulation prior to relaying the IPSec payload to the gateway. Similarly, the server encapsulates the IPSec payload received from the gateway in a TLS envelop prior to forwarding to the UE over the IPSec tunnel. When the server determined that the UE is already attached, it may have received a cookie from the gateway, where the cookie corresponds to the IPSec tunnel instance that is alive for the UE. This cookie may later on be used by the UE at re-login to the server.

In some embodiments, the server has determined that the UE is not attached for RTC services or should attach and has relayed that information to the UE, the server then receives a second HTTPS request from the UE, where the second HTTPS request comprising an indication for a UE attach for RTC services. Upon receiving the second HTTPS request requesting UE attach for RTC services, the server waits for receiving an authentication exchange message from the UE which it relays to the gateway. The server receives an authentication exchange message from the gateway which it relays to the UE. The authentication exchange message received from the UE may be encapsulated in a TLS, envelop, in which case, the server removes the TLS encapsulation prior to relaying the authentication exchange message to the gateway. Similarly, the server encapsulates the authentication exchange message received from the gateway in a TLS envelop prior to forwarding to the UE. Once the authentication exchange is successfully completed and the IPSec tunnel is established between the UE and the gateway, the server is notified by the gateway that the authentication is completed and the IPSec tunnel is alive. The server may receive a cookie attached to the alive IPSec tunnel instance. Subsequently, the server sends an HTTPS response back to the UE, in response to the second HTTPS request for UE attach, in which it indicates to the UE that it is attached and logged in to the server. The server includes the cookie if one is received from the gateway. The IPSec payload is then relayed by the server between the UE and the gateway. Similarly to the above, the IPSec payload may be encapsulated in a TLS envelop when transported between the UE and the server. The server encapsulates and decapsulates the IPsec payload as required.

In one embodiment, the authentication exchange is an IKE exchange utilizing any extended authentication protocol, EAP, such as for example EAP-AKA.

In some embodiments, the server after receiving the notification from the gateway that the UE is authenticated and the IPSec tunnel is alive for RTC services, it may send a message to the WLAN to indicate that the UE is authenticated in order to open the gate for internet traffic to be routed locally from the WLAN, alternatively the internet traffic may be routed directly from the server to the internet.

In some embodiments, a UE is configured to sending over the WLAN an HTTPS request to login to a server in the network for receiving RTC services or WiFi calling services. The UE may include in the HTTPS request the UE location information, the local IP address assigned to the UE by the WLAN and a cookie that may have been previously received from the server if the UE has already an IPSec tunnel but wish to re-login to the server.

In response to the HTTPS request, the UE receives an HTTPS response message that indicates to the UE the status of the login at the server and of the attach state at the gateway (e.g., ePDG) of the mobile operator's network. If the UE determines based on the attach state that it should attach to the network for RTC services, in other words, there is no valid IPSec tunnel instance for the UE, the UE triggers a UE attach procedure for establishment of an Internet Protocol Security, IPSec tunnel for RTC services. If, however the UE determines from the HTTPS response that the UE is now logged in to the server and that it is still attached with a valid IPSec tunnel in the network, the UE can start sending and receiving IPSec payload for the RTC service. In this case, the HTTPS request from the UE is a request to re-login to the server and the UE has already an IPSec tunnel instance. In an embodiment, the UE may encapsulate the IPSec payload (i.e., ESP payload) in a TLS envelop when sending the IPSec payload to the server. Similarly, if the UE receives from the server IPSec payload encapsulated in a TLS envelop, it removes the encapsulation and forwards the IPSec payload to the corresponding application in the UE.

According to an embodiment, the UE triggers the UE attach procedure for establishment of the IPSec tunnel by sending over the WLAN a second HTTPS request from the UE that indicates that the HTTPS request is for UE attach for RTC services. The UE then starts an authentication exchange for authentication and establishment of an IPSec tunnel. The UE may encapsulate the authentication exchange request message in a TLS envelop when sending the authentication request message to the server. Similarly, if the UE receives from the server the authentication message encapsulated in a TLS envelop, it removes the encapsulation and forwards the authentication message to the WiFi calling client in the UE. If the authentication exchange is successfully completed and the IPSec tunnel instance is established, the UE receives an HTTPS response message that comprises an indication of a successful UE attach and successful login to the server. In an embodiment, the HTTPS response message may also comprise a cookie for use in subsequent re-login.

The IPsec tunnel instance established between the gateway and the UE may exclusively be used for RTC services (i.e., WiFi calling services).

In some embodiments, a gateway in the mobile operator's network, which may be co-located with the server is configured to receive for a UE, a request to start RTC service, also known as in this disclosure as WiFi calling service. The request to start RTC service may include a cookie if the UE was previously attached, a local IP address assigned to the UE by the WLAN and UE location information. The gateway may use the cookie if one is received in the request to start RTC services and the local IP address assigned to the UE by the WLAN in order to determine the attach status for the UE. If the gateway finds that the UE is already attached and that an IPSec tunnel exists for the UE, the gateway sends a response to the start request indicating that the UE is already attached else the gateway sends a response instructing the UE to attach in order to establish the IPSec tunnel. In an embodiment, if the gateway sends a response to the start request indicating that the UE is already attached, the gateway may generate an updated cookie and include it in the response.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

Embodiments of the present invention will now be described, by way of example only, with reference to the attached Figures, wherein:

FIG. 1 illustrates a sequence diagram of a UE logging and attaching for WiFi calling service according to an embodiment.

FIG. 2 illustrates a sequence diagram of a UE re-logging for WiFi calling service according to an exemplary embodiment.

FIG. 3 illustrates a flowchart of a method executed at an HTTP server for connecting a UE to a gateway (e.g., ePDG), according to an embodiment.

FIG. 4 illustrates a detailed flowchart of a UE initial attach method at an HTTP server for WiFi calling service according to an embodiment.

FIG. 5 illustrates a flowchart of a method executed at a UE for connecting to a gateway (e.g., ePDG) for WiFi calling service, according to an embodiment.

FIG. 6 illustrates a flowchart of a method executed at a gateway (e.g., ePDG) for connecting a UE to the mobile operator's network, according to an embodiment.

FIG. 7 is a schematic illustration of a protocol stack for control signaling between the UE, HTTP server and gateway (e.g. ePDG) according to an embodiment.

FIG. 8 is a schematic illustration of a protocol stack for user plane traffic between the UE, the HTTP server and the gateway (e.g. ePDG) according to an embodiment.

FIG. 9 is a schematic illustration of a TLS Encapsulation according to an embodiment.

FIG. 10 is a schematic illustration of an HTTP server according to an embodiment.

FIG. 11 is a schematic illustration of a UE according to an embodiment.

DETAILED DESCRIPTION

The various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

Many aspects of the invention are described in terms of sequences of actions or functions to be performed by elements of a computer system or other hardware capable of executing programmed instructions. It will be recognized that the various actions could be performed by specialized circuits, by program instructions being executed by one or more processors, or by a combination of both. Moreover, the invention can additionally be considered to be embodied entirely within any form of computer readable carrier or carrier wave containing an appropriate set of computer instructions that would cause a processor to carry out the techniques described herein.

A mobile operator typically offers real time telecommunication services such as voice and video conference services for users using cellular access technology such as Long Term Evolution, LTE access technology. VoLTE and ViLTE are one of two services that mobile operators are currently launching over LTE using the IMS infrastructure. The users have to attach to the mobile operator's packet core network, EPC and be authenticated by the HSS/AAA. The PGW is the packet anchor node in the EPC which assigns the IP address for the UE and acts as a gateway for all traffic between the UE and the packet data network, PDN, where the mobile operator's IMS is deployed. All IMS traffic is transported transparently over the EPC between the UE 100 and the PGW 130. However, the IMS application communicates to the EPC the quality of service needs for the media associated with the IMS session, so that the appropriate quality of service bearers are established over the EPC and the LTE access network for delivery of the corresponding media packets to and from the UE.

As all LTE devices typically include support for WiFi connectivity as well, users could configure their UEs to switch to WiFi access when such access is available (e.g., at home or hotel). Additionally, when mobile operators deploy their own WiFi or have trusted relationship with other WLAN providers, users are able to connect to the mobile operator's offered VoLTE and ViLTE services using built-in Wifi calling when connected to such trusted WiFi, just like they would do if they were connected over an untrusted WiFi, i.e., over an established secure IPSec tunnel. However, unlike built-in WiFi calling over untrusted WiFi, the built-in WiFi calling service over trusted or managed WLAN as described in this disclosure enables the mobile operators to offload internet traffic to the trusted or managed WLAN. The internet traffic could thus be routed locally from the WLAN to the internet, while the voice and/or video related signalling and media traffic are tunneled to the EPC through an HTTP server and an ePDG over the secure IPSec tunnel. The EPC then forwards the built-in WiFi calling related traffic to the corresponding application (e.g., IMS). Additionally, the current disclosure allows for a common authentication to be performed by the mobile operator's network for both the IPSec tunnel establishment for the built-in WiFi calling service and local routing of internet traffic over the WLAN wherein the mobile operator's authorizes the WLAN to open the gate for local traffic.

The HTTP server may be deployed in the mobile operator's network or in the managed/trusted WLAN 101, or may be co-located with the ePDG. When deployed in the mobile operator's network, whether standalone or co-located, and in order for the UE 100 to reach the HTTP server, the UE may either be preconfigured with the HTTP server IP address/name or the UE may be redirected by the WLAN to the HTTP server in the mobile operator's domain.

In this disclosure, WiFi calling service is used henceforth to indicate built-in WiFi calling service. Furthermore, WiFi access and WLAN are used interchangeably and a UE attach is synonymous to UE registration.

FIG. 1 is a sequence diagram illustrating details of a UE 100 logging and attaching to the EPC through an HTTP server 102 and an ePDG 103 in support of WiFi calling service over trusted/managed WiFi access or WLAN 101 according to an embodiment. In this embodiment, the UE has no IPSec tunnel instance, hence was not previously attached to the network. The UE 100 determines that WiFi is available and the WiFi access can be trusted, either because the WLAN is managed by the user's operator network or the WLAN provider is trusted by the user's mobile operator network, i.e., there exists roaming agreements or service level agreements between the WLAN provider and the mobile operator. At step 109, the UE 100 connects to the WLAN 101 and acquires a local IP address assigned by the WLAN 101. The WLAN 101 opens a configured whitelist allowing the UE 100 to connect to some servers. The server whitelist for the UE 100 may be provided as part of the service level agreement or roaming agreement with the mobile operator network. As previously explained, the UE 100 is either preconfigured with the whitelisted HTTP server 102 IP address or domain name, or discovers the HTTP server 102. To discover the HTTP server 102, the UE 100 may receive the HTTP server 102 address via a Dynamic Host Configuration Protocol, DHCP option, from the WLAN 101. If DHCP is not used or does not provide the HTTP server 102 address option, the UE 100 may receive it from a local HTTP server in the WLAN as shown in FIG. 1. The UE 100 may at step 110 send an HTTP request with an indication for WiFi calling service to a local HTTP server hosted in the WLAN 101. At step 111, when the local HTTP server determines that the HTTP request is for WiFi calling service, it sends an HTTP redirection back to the UE indicating the HTTP server 102 address to which the HTTP request should be redirected and may include an address of an ePDG 103. The HTTP response may also include location information (such as the WLAN Access Point, AP MAC address and/or AP IP address, and/or WLAN access gateway, WAG, IP address if available and where the WAG may be implemented in an Access Controller, AC, Broadband Network Gateway, BNG within the WLAN 101).

Additional location information may include cellular location information if cellular coverage overlaps with the WiFi coverage and if the cellular access network interworks with the WiFi access network allowing the WiFi access network to receive cellular related location information.

At step 112, the UE sends a secure HTTP request, HTTPS request, for logging to the HTTP server 102 for WiFi calling service. HTTPS protocol is well known and corresponds to HTTP over Transport Layer Security, TLS, as specified in IETF RFC 2818. TLS as specified in IETF RFC 5246 provides a secure connection between the UE 100 and the HTTPS server 102. The HTTPS request includes the WiFi calling service indicator and the UE identity (e.g., IMSI). It may also include if received at step 111, the address of the ePDG 103 and may also include location information, such as the WLAN AP MAC address and/or AP IP address and/or WAG IP address. Additional location information may include cellular location information if the WiFi coverage overlaps with the cellular coverage. The cellular location information may be determined by the UE 100 itself or provided by the local HTTP server at step 111 above. Further, the HTTPS request may include the UE local IP address assigned by the WLAN and a cookie if the UE was previously attached and has an IPSec tunnel instance. At step 113a, the HTTP server 102 determines the HTTPS request is for WiFi calling service, and accepts the UE HTTPS request and selects the ePDG 103 that will handle establishment of the IPSec tunnel for the WiFi calling service. The HTTP server 102 may use the following methods to identify the ePDG 103:

1. use the address of the ePDG 103 in the HTTPS request, if one is included, or
2. use the internal ePDG 103 if HTTP server 102 is co-located with the ePDG 103.

The HTTPS server 102 triggers a message, named start request in FIG. 1, to the ePDG 103 to indicate that the UE 100 is connected to the HTTPS server 102, and to start UE registration and establishment of the IPSec tunnel between the UE 100 and the ePDG 103. The start_request includes the UE identity (e.g., IMSI), the WiFi calling service indicator and may include the UE local IP address assigned by the WLAN, the cookie and UE location information if received in the HTTPS request at step 112.

At step 113b, the ePDG 103 verifies its internal resources to determine if it is able to handle the start_request, and uses the received information in the start-request to determine if the UE is already attached with a valid IPSec tunnel. If resources are available to handle the request and the UE is not already attached with a valid IPSec tunnel, it sends a start_response to the HTTP server 102 indicating that UE is not attached or that UE attach is required. Alternatively, it rejects the start_request if resources are not available in which case it may indicate an alternative ePDG. To determine if the UE is already attached with a valid IPSec tunnel instance, the gateway may use the UE local IP address and/or the cookie if received in the start-request to locate the UE context in the gateway. As FIG. 1 illustrates an initial attach, the remaining description of FIG. 1 will focus on initial attach with no previous existing IPSec tunnel. The HTTP server 102, at step 113b, processes the start_response message, and if the message indicates that the UE is not attached or UE should attach, the HTTP server 102 sends at step 114 an HTTPS 200 OK back to the UE 100, where the HTTPS 200 OK message includes the WiFi calling service indicator and a registration/attach indicator to indicate to the UE 100 that it should register/attach to establish an IPSec tunnel with the ePDG 103 through the HTTP server 102 in order to establish the WiFi calling service. In response to the HTTPS 200 OK received at step 114, the UE triggers a second HTTPS request at step 115, and where the HTTPS request is sent to indicate that the UE requests to be attached for WiFi calling service with the ePDG 103 and establishment of IPSec tunnel with the ePDG 103. The HTTP server 102 prepares to receive and relay the IKE exchange between the UE 100 and the ePDG 103 for the purpose of authentication and establishment of the IPSec tunnel.

Following the sending of the second HTTP request at step 115, the UE starts the IKE exchange comprising the IKE_SA_INIT and IKE_AUTH exchange as per IETF RFC 5996. The UE 100 encapsulates the IKE exchange in a TLS envelop before transmitting the IKE message to the HTTP server 102. The HTTP server 102, decapsulates the received IKE messages from the UE 100 before relaying them to the ePDG 103. At step 116b, the ePDG 103, performs authentication with the AAA/HS S server 104. The authentication procedure at the ePDG 103 is as described in 3GPP TS 23.402, 3GPP TS 29.273 and 3GPP TS 24.302 and is no different than the authentication procedure executed at the ePDG for UE access over untrusted WLAN. The ePDG 103 responds to the received IKE messages from the UE by sending IKE response messages to the HTTP server 102. The HTTP server 102 encapsulates the IKE response messages in the TLS envelop before forwarding them to the UE at step 116. Although not shown, it is understood that during the IKE authentication exchange, the ePDG 103 has established a first/default S2b bearer with the PGW in the EPC. The PGW (not shown in FIG. 1) assigns an IP address for the UE 100 for access to the PDN through the PGW.

When the IKE exchange is completed, the UE is considered registered, i.e., the UE 100 has been successfully authenticated by the ePDG 103 and HSS/AAA server 104, a first/default S2b bearer between the ePDG 103 and the PGW is established, the UE is assigned an IP address by the PGW in the EPC for access to the PDN, and a first IPSec tunnel instance between the UE 100 and the ePDG 103 is successfully established. At step 117, the ePDG 103 may also generate a cookie to indicate that the IPSec tunnel is alive and sends to the HTTP server 102 a message called Online_request message in FIG. 1 and where the message is indicative that the UE is successfully authenticated and that the IPSec tunnel is alive for the UE 100. The Online-request message includes the generated cookie. The HTTP server 102 acknowledges the Online_request message by sending an Online response message at step 118 back to the ePDG 103. Simultaneously or subsequently to Step 118, the HTTP server 102 sends at step 119 an HTTPS 200 OK message back to the UE, in response to the second HTTPS request message received at step 115. The HTTPS 200 OK message includes the cookie generated by the ePDG 103, an indication that the UE is successfully logged in to the HTTP server 102 as well as successfully registered/attached to the ePDG 103 through the HTTP server 102. The cookie is generated by the ePDG 103 so the UE 100 can include it in subsequent re-login. The presence of the cookie in the re-login procedure may enable reconnecting the UE 100 with the ePDG 103 through an existing IPSec tunnel without the need to re-establish a new IPSec tunnel.

Simultaneously or subsequently to step 119, when the HTTP server 102 receives the Online_request message indicating that the UE is successfully authenticated by the EPC and that the IPSec tunnel is alive for the UE 100, the HTTP server 102 may notify the WLAN 101 at step 120 that the UE is successfully authenticated and that WLAN 101 is allowed to route internet traffic from the UE to the internet directly from the WLAN 101. The UE uses the local IP address for internet traffic and all WiFi calling related traffic is routed to the EPC. Alternatively, the internet traffic may be routed through the HTTP server based on the mobile operator policies. At step 121, the UE 100 starts establishing the WiFi calling session by for example using session initiation protocol, SIP, between the IMS client in the UE 100 and the IMS system in the PDN. All the SIP exchange for establishing the WiFi calling session are sent as ESP payload encapsulated in a TLS envelope between the UE 100 and the HTTP server 102. The HTTP server 102 extracts the ESP payload from the TLS envelope, containing the SIP messages from the UE 100 and forwards the ESP payload to the ePDG 103. Similarly, the HTTP server 102 encapsulates in a TLS envelope the received ESP payload containing the SIP messages from the IMS system and forwards them encapsulated to the UE 100. Accordingly, the UE 100 encapsulates and decapsulates the ESP payload.

At step 122 which may be subsequent to step 120, if the WLAN has received a notification that the UE is authenticated and authorized, the WLAN 101 allows internet traffic sent from the UE local IP address to be routed directly from the WLAN 101 to the internet bypassing the mobile operator's EPC.

Note that if TLS encapsulation/decapsulation is used at the UE 100 and the HTTP server 102 to encapsulate/decapsulate IKE exchange and IPSec payload, it is also used to encapsulate all subsequent IKE messages such as IKE notification, Keep alive, etc.

FIG. 2 illustrates a sequence diagram when the UE 100 requests re-login for WiFi calling service according to another embodiment of the present disclosure. In this embodiment, the UE 100 has already an IPSec tunnel instance. The UE 100 may trigger re-login procedure if for example the login timer or attach timer has expired, or the UE 100 handovers to another AP in the WLAN 101, while maintaining the IPSec tunnel instance established during the attach procedure. As illustrated in FIG. 2 and similar to FIG. 1, the UE 100 sends at step 112, an HTTPS request to the HTTP server 102 for re-logging for WiFi calling service. The UE 100 includes the WiFi calling service indicator, the UE identity (e.g., IMSI) and the cookie that was received during the UE attach procedure from step 119 of FIG. 1 or perhaps a previous re-login procedure. The HTTPS request may also include the UE local IP address assigned by the WLAN and the UE location information, such as the WLAN AP MAC address and/or AP IP address and/or WAG IP address and/or cellular location information if the WiFi coverage overlaps with the cellular coverage. At step 113*a*, the HTTP server 102 queries the ePDG 103 in a message named Start_Request, about the status of the IPSec tunnel where it includes the UE identity (e.g., IMSI) and includes if received at step 112, the cookie, the UE local IP address and the UE location information. The ePDG 103 uses the UE identity (e.g., IMSI), cookie and the UE local IP address to find and validate any existing context for the UE and to determine if the UE had handover between APs. The context indicates the UE authentication state with the IPsec tunnel state. If the gateway finds that an IPsec tunnel instance exists and is valid (i.e., UE authentication is still considered valid), it validates the cookie. If the cookie is indeed previously generated by the ePDG 103, it generates an updated cookie and sends the generated cookie to the HTTP server 102 at step 113*b* indicating that the UE is already attached with a valid IPSec tunnel instance. If the ePDG 103 determines that there is no valid IPSec tunnel for the UE 100 or that it determines that the received cookie is not valid, the ePDG 103 sends at step 113*b* a response message to the HTTP server 102 indicating that the UE should (re)attach to re-establish the IPSec tunnel. If the received local IP address is different than the UE local IP address in the stored context, the ePDG 103 may also sends at step 113*b* a response message to the HTTP server 102 indicating that the UE should (re)attach to re-establish the IPSec tunnel due to handover. Upon receiving the response from the ePDG 103, the HTTP server 102 sends to the UE 100 at step 114 an HTTPS response message including the result of the logging request, where the result may include:

3. an updated cookie and an indication of a successful attach and login where the UE 100 has already an active IPSec tunnel at which point the UE can start sending and receiving WiFi calling related traffic as ESP payload over TLS as shown at step 121, or
4. an indication that UE has to (re) attach to re-establish the IPSec tunnel, at which point, steps 115-120 of FIG. 1 are repeated, where the steps describe the UE attach and IPSec establishment with the ePDG 103 through the HTTP server 102. Once the UE 100 is successfully attached, the UE 100 can then start sending and receiving WiFi calling related traffic as ESP payload which may be sent over TLS as shown at step 121.

FIG. 3 is a flow chart that illustrates method 30 for logging to an HTTP server 102 and attaching to an ePDG 103 for WiFi calling service. The HTTP server 102 and ePDG 103 may be co-located. At step 31, the HTTP server 102 receives an HTTPS request for logging to WiFi calling service and includes the UE identity (e.g., IMSI), the WiFi calling service.

As previously indicated a WiFi calling service corresponds to real time communication services such as voice and video calling. In an alternative embodiment, the HTTPs request may include UE local IP address assigned by the WLAN 101. UE location information such as the WLAN AP MAC address and/or AP IP address and cellular location information if the WiFi coverage overlaps with the cellular coverage. The location information is saved in the HTTPS server 102 or sent to the ePDG 103 where it is stored. In yet another embodiment, the HTTPS request may include a cookie to indicate that the UE wants to re-login to HTTP server 102. The cookie was assigned by the ePDG 103 in a previous successful attach or HTTP server 102 re-login. The cookie, if validated by the ePDG 103 through the HTTP server 102 is used to validate the UE and verify if an active IPSec tunnel exists, in which case, the UE 100 and the ePDG 103 continue to use the existing IPSec tunnel instance and there is no need to re-authenticate and re-establish a new IPSec tunnel instance. In yet an alternative embodiment, the HTTP request may include the ePDG identifier (e.g., IP address or other identifier) if one was received from the WLAN 101. The following shows an example of the indications that could be sent to the HTTP server 102 in an HTTPS request, e.g., HTTPS GET request message for logging to WiFi calling service:

| HTTP GET request | Header | GET /<url>: <any url to visit, preconfigured url, or previously redirected url> wifi_calling/login?wifi_calling_service indicator=1 UE identifier optional: loc_gw_ip=WAG IP if provisioned in previous redirection loc_gw_mac=WAG MAC if provisioned in previous redirection |
|---|---|---|

-continued

|  | local_ue_ip=Local UE IP address<br>ue_mac=UE MAC if available<br>loc_ap_ip=AP IP if available<br>loc_ap_mac=AP MAC if available> HTTP/1.1<br>ePDG IP address= ePDG IP address if<br>provisioned in previous redirection or DHCP<br>option |
|---|---|
| Cookie | WiFi calling cookie = value (if present, the value is the one that was provided in a previous 200 OK message) |

As illustrated in the embodiment of FIG. 3, the HTTP server 102 at step 32 needs to determine if the UE is attached to the ePDG 103. To do so, the HTTP server 102 sends a message to the ePDG 103 to indicate to the gateway that the UE wants to start WiFi calling service, and to determine if the UE 100 is attached at the ePDG 103 for the WiFi calling service. The HTTP server 102 determines the ePDG 103 using the ePDG address from the UE if one was received or configured at the HTTP server 102. The HTTP server 102 includes the UE identity (e.g., IMSI), and if received at step 31, the cookie, the UE local IP address and the UE location information. The HTTP server 102 receives a response from the ePDG 103, where the ePDG 103 indicates to the HTTP server 102 the UE attach state. The UE attach state indicates one of the following information:
5. UE attached, IPSec tunnel instance is alive and may include a cookie (initial attach), or
6. UE not attached or UE should attach to receive the service, or
7. UE already attached and may include an updated cookie (re-login procedure).

At step 33, the HTTP server 102 sends an HTTPS response back to the UE. The HTTPS server 102 indicates to the UE the login and the attach result. If a cookie is received from the ePDG 103, the HTTP server 102 forwards the cookie to the UE 100. The cookie is included when an IPSec tunnel is successfully established or a valid IPSec tunnel already exists and is still valid. The following shows an example of the indications that could be sent to the UE in an HTTPS response message, i.e., HTTPS 200 OK response message, in response to an HTTPS request for logging to WiFi calling service:

| HTTP 200 OK response | Header | HTTP/1.1 200 OK |
|---|---|---|
|  | Body | epdg_id: <epdg domain name or IP address if available for result = 1><br>login:<br>0 failed<br>1 login to HTTP server successful<br>Attach:<br>0 failed to attach<br>1 attach to gateway successful<br>2 UE not attached<br>Logout:<br>0: failed<br>1: logout from HTTP server successfully |
|  | Set-cookie | cookie = value (provided to UE when login: 1 or attach: 1); Expire = //1 day |

At step 34, the HTTP server 102 verifies based on the response from the gateway if UE is attached at the ePDG 103 with a valid IPSec tunnel. If the UE 100 is not attached, the HTTP server 102 performs UE attachment at step 35. The detailed process of step 35 is shown in FIG. 4. If however, the HTTP server 102 determined the UE 100 is attached and an IPSec tunnel is established, the HTTP server 102 at step 36 starts relaying and receiving IPSec payload between the UE 100 and the ePDG 103. The IPSec payload may additionally be transported over TLS between the UE 100 and the HTTP server 102, in which case, TLS terminates at the HTTP server 102 and the IPSec payload is further transmitted between HTTP server 102 and the ePDG 103 over a different interface. IPSec payload is transparent to the HTTP server 102.

FIG. 4 illustrates a flow chart showing the details of UE attachment of step 35 in FIG. 3. The HTTP server 102 determines that the UE 100 is not attached and indicates to the UE 100 at step 33 of FIG. 3 that it should attach to receive the service. Subsequently to that determination, the HTTP server 102 at step 35a of FIG. 4 receives a second HTTPS request from the UE 100, this time the request is for UE attach for WiFi calling service. The HTTP server 102 prepares for receiving the IKE exchange for authentication and establishment of the IPSec tunnel.

At step 35b of FIG. 4, the HTTP server 102 starts receiving the first IKE exchange request message from the UE 100 as payload encapsulated in TLS for forwarding to the ePDG 103. The IKE request message is not processed by the HTTPS server 102. Instead, the HTTP server 102 receives the IKE request message from the UE which may be encapsulated by TLS. The HTTP server decapsulates the IKE request message and relays the IKE request message to the ePDG 103. When the HTTP server 102 receives an IKE response message from the ePDG 103, the HTTP server 102 encapsulates the IKE response message and sends it over the TLS connection to the UE 100. The HTTP server 102 performs the above operation until the IKE exchange is completed between the UE 100 and the ePDG 103. When the IKE exchange is successfully completed, the HTTP server 102 at step 35c, is notified by the ePDG 103 that the IPSec tunnel is successfully established, in other words the UE 100 is successfully attached. Note that, the ePDG 103 may include a cookie in the notification to the HTTP server indicating that the IPSec tunnel is alive for the UE 100. The UE 100 may include the cookie in subsequent re-attach or re-login to the HTTP server 102 to optimize the re-attach or re-login signaling procedure. Further, step 35c in FIG. 4 illustrates the step of sending an HTTPS response message from the HTTP server 102 to the UE 100 indicating that the UE is successfully attached with an active IPSec tunnel instance and that the UE is now logged-in to the HTTP server 102.

In an alternative embodiment and in parallel to sending the HTTP response message to the UE 100 in step 35c of FIG. 4 to indicate successful attach and login, the HTTP server 102 may notify the WLAN 101 that the UE is authenticated and authorizes WLAN 101 to locally route the internet traffic from the UE 100 to the internet where the UE uses the local IP address assigned by the WLAN 101. The WiFi calling traffic is routed through the HTTP server 102 and the ePDG 103 to the rest of the EPC towards the PDN where the WiFi calling application server is located, e.g., IMS.

Alternatively, instead of locally routing the UE internet traffic from the WLAN 101 to the internet, the UE internet traffic may be routed directly from the HTTP server 102 to the internet. Unlike the prior WiFi calling service, the mobile operator has the flexibility to determine if the internet traffic, which is different from WiFi calling traffic is routed through the trusted WLAN 101 or through the HTTP server 102. Notably, the UE authentication performed during the IKE exchange is used as a common authentication to authenticate the UE attaching to the ePDG 103 in the EPC in order to establish the IPSec tunnel and login to the HTTP server 102 for WiFi calling service, but also to authorize the UE internet traffic to be routed through the WLAN 101 or through the HTTP server 102. Hence, the UE is not required to authenticate through the WLAN such as login to local HTTP server in WLAN 101 via user name and password to access the internet as it has already been authenticated for WiFi calling service by the EPC.

Subsequent to sending the HTTPS response message to the UE 100 as described at step 35c of FIG. 4, the HTTP server 102 receives WiFi calling related traffic as ESP payload which may be transported over TLS from the UE. The HTTP server 102 relays the ESP payload to the ePDG 103. Similarly, the HTTPS server 102 receives WiFi calling related traffic from the ePDG 103 over the HTTPS server 102-ePDG 103 interface, may encapsulate the ESP payload in a TLS envelop and relays the ESP payload to the UE 100. The WiFi calling related traffic may be SIP signaling traffic as well as corresponding media traffic (voice and/or video packets). An example of the TLS envelop is shown in FIG. 9.

FIG. 5 illustrates a flowchart of a method 50 executed at a UE 100 for connecting to a gateway 103 (e.g., ePDG) for WiFi calling service, according to an embodiment. The UE 100 connects to the ePDG 103 for WiFi calling service by logging-in to the HTTP server 102 and attaching to the ePDG 103 for establishment of an IPSec tunnel instance. Alternatively, the UE 100 may already have an IPSec tunnel instance, but wishes to re-login to the HTTP server 102 for e.g., if login timer or attach timer has expired or the UE 100 has handover from one AP to another AP in the WLAN 101. The re-login request may trigger the UE to re-attach to the gateway and re-establish a new IPSec tunnel instance in case the IPSec tunnel instance at the ePDG 103 is no longer valid. As illustrated in FIG. 5, step 51, the UE 100 sends an HTTPS request to an HTTP server 102 to login to WiFi calling service. Prior to step 51 however, the UE 100 could use various methods to discover the HTTPS server 102, which include:

1. UE pre-configuration of the HTTP server 102 IP address or domain name, or
2. UE 100 receives the HTTP server 102 address via a Dynamic Host Configuration Protocol, DHCP option, from the WLAN 101, and may additionally include the ePDG 103 address option, or
3. UE 100 may be redirected from the WLAN 101 to the HTTP server 102 using an HTTP redirection method using an HTTP server hosted in the WLAN 101. When using the redirection method, the UE 100 sends an HTTP request to the local HTTP server in WLAN 101 and includes an indication for WiFi calling service. When the local HTTP server determines that the HTTP request is for WiFi calling service, it sends an HTTP redirection back to the UE indicating the HTTP server 102 address to which the HTTP request should be redirected and may include an address of an ePDG 103. The HTTP redirection may also include location information (such as the WLAN Access Point, AP MAC address and/or AP IP address). Additional location information may include cellular location information if cellular coverage overlaps with the WiFi coverage and if the cellular access network interworks with the WiFi access network allowing the WiFi access network to receive cellular related location information.

The UE 100 includes in the HTTPS request a WiFi calling service indicator, a UE identity (e.g., IMSI) and may include the ePDG 103 address if known, the UE local IP address assigned by the WLAN 101 and the UE location information as described above. Note that if the UE 100 requests a re-login to the HTTP server 102, the HTTPS request may include a cookie previously received by the HTTP server 102 at initial attach or previous HTTP server re-login.

At step 51, the UE receives an HTTPS response from the HTTPS server. In the illustrated embodiment, the HTTPS response may be an HTTPS 200 OK that comprises information related to the attach state. The information may include a combination of the following indicators:

8. UE login (1)/not login (0) (to HTTPS server)
9. UE attach (1)/not attached or should attach (2)/attach failed (0) (at the ePDG 103)
10. Cookie (only if UE login (1) and UE attach (1) are received)

At step 53, the UE analyzes the information received. The following table summarizes an exemplary embodiment of the UE behaviour based on the received information in the HTTPS response message:

| UE login | UE attach | Cookie | UE action |
|---|---|---|---|
| 0 | 0 | No | Attach failed: UE 100 may attempt to attach by re-sending an HTTPS request for WiFi calling service to login to the HTTP server 102. |
| 0 | 1 or 2 | No | UE 100 should (re)attach and send an HTTPS request for WiFi calling service with an attach indicator. |
| 1 | 1 | Yes | UE 100 is successfully attached and logged in to the HTTPS server 102. IPSec tunnel is established. UE 100 stores cookie. UE 100 may start sending WiFi calling service traffic (signaling + media) as ESP payload over the IPSec tunnel. In the event of re-login, the UE 100 sends an HTTPS request for re-login and may include the received cookie. |

Step 53 of FIG. 5 illustrates an embodiment where the UE 100 receives an HTTPS response in response to the logging request at step 51, indicating that the UE 100 is not attached or that it should attach to establish an IPSec tunnel. The UE 100 triggers the attach procedure where it attempts to attach by for example sending an HTTPS request for WiFi calling service to the ePDG 103, this time indicating that the request is to attach. Following the sending of the HTTPS request for attach, the UE initiates an authentication exchange. If the UE 100 uses the IKE exchange to authenticate and establish the IPSec tunnel, the UE 100 starts the IKE exchange consisting of the IKE_SA_INIT and the IKE_AUTH exchange as per IETF RFC 5996. The UE 100 may encapsulate the IKE request messages of the exchange in a TLS envelope before transmitting the IKE message to the HTTP server 102. Once the IKE exchange is completed, the UE 100 is considered authenticated, the IPSec tunnel is established and the UE 100 is assigned an IP address for access to the PDN where the WiFi calling service application servers are located. As part of the UE attach procedure, the UE 100 receives a response to the HTTPS request for attach indicating the UE is attached and logged-in with a valid IPSec tunnel instance, and a cookie may be included in the response message. Once the HTTPS response message for attach is received, the attach procedure is considered completed. The UE 100 may start sending WiFi calling service traffic (signaling+media) as ESP payload over the IPSec tunnel. The UE 100 may encapsulate the ESP payload in a TLS envelope before transmitting to the ePDG 103 through the HTTP server 102.

Step 54 of FIG. 5 illustrates the embodiment where the UE 100 receives an HTTPS response in response to the logging request at step 51 indicating that the UE is already attached and that the IPSec tunnel instance is valid. In this embodiment, the HTTPS request for logging to WiFi calling service at step 51 is treated as a re-login request and may include a cookie that is received in the previous successful logging attempt. Upon receiving the HTTPS response indicating the IPSec tunnel is active and the UE 100 is logged-in, the UE 100 can start sending WiFi calling service traffic (signaling+media) as ESP payload over the IPSec tunnel. The UE 100 may encapsulate the ESP payload in a TLS envelope before transmitting to the ePDG 103 through the HTTP server 102.

At any time, the UE 100 may select to logout from the HTTP server 102. The UE could then send an HTTPS request to the HTTP server 102 with an indication to logout. The TLS connection is released. The UE may release or maintain the IPSec tunnel instance which may be re-activated if the user or the UE selects to re-login to the HTTPS server 102.

FIG. 6 illustrates a flowchart of a method 60 executed at a gateway (e.g., ePDG 103) for connecting a UE 100 to the mobile operator's network, EPC, according to an embodiment. The ePDG 103 and the UE 100 communicate through the HTTP server 102. At step 61, the ePDG 103 receives a start-request from the HTTP server 102 indicating that a UE wants to establish a connection to start WiFi calling service. The start-request is received over an interface with the HTTP server 102, which may be an internal interface if the ePDG 103 is co-located with the HTTP server 102. The start-request includes the UE identity (e.g., IMSI), the WiFi calling indicator. The start-request may also include a cookie which may be generated by ePDG 103 and provided to the UE 100 in a previous IPSec tunnel establishment procedure for the same UE 100 and it may include UE local IP address and UE location information if any is received at step 31 of FIG. 3. If UE location information is received, the ePDG 103 stores the information as it may be retrieved by location server application in the EPC or PDN.

At step 62 of FIG. 6, the ePDG 103 determines the attach status of the UE 100, i.e., determines if the UE 100 has a valid IPSec tunnel established and if the ePDG 103 has enough resources to establish an IPSec tunnel for the UE 100. If at step 63, the ePDG 103 determines that an IPSec tunnel is not available for the UE 100 or that the received cookie is not valid, or that received UE local IP address indicate a handover in the WLAN, the ePDG 100 sends a response to the start-request indicating that the UE 100 is not attached or should attach to establish the IPSec tunnel with the ePDG 103. If at step 63, the ePDG 103 determines that the received UE local IP address has changed to indicate a handover in the WLAN, the ePDG 100 may send a response to the start-request indicating that the UE 100 is should re-attach to establish the IPSec tunnel with the ePDG 103. The UE attach and establishment of the IPSec tunnel consists of an authentication exchange (e.g., IKE exchange) to authenticate the UE, establishment of a PDN connection with the PGW in the rest of the EPC and establishment of the IPSec tunnel. The procedure is similar to the attach and establishment of the IPSec tunnel described in 3GPP TS 23.402, 3GPP TS 29.273 and 3GPP TS 24.302. Once the IPSec tunnel is established and alive, the ePDG 103 sends a response to the HTTP server 102 indicating the IPSec tunnel is alive and may include a cookie generated by the ePDG 103 as shown in step 65. The ePDG 103 is ready to transmit the WiFi calling service related traffic received from the UE to the PGW for transmission to the PDN. The ePDG 103 receives the WiFi calling service related traffic as ESP payload from the UE 100 through the HTTP server 102. The ePDG 103 is also ready to transmit the WiFi calling service traffic received from the PDN as ESP payload to the UE through the HTTP server 102.

If at step 63 of FIG. 6, the ePDG 103 determines that an IPSec tunnel is already available for the UE 100 and the cookie is valid, and optionally the UE local IP address corresponds to the one stored in the ePDG 103 context, i.e., no handover, the ePDG 100 at step 65 sends a response to the start-request indicating that the UE 100 is already attached and that the IPSec tunnel is valid and alive. The ePDG 103 may generate an updated cookie and include the updated cookie in the response message sent to the HTTP server 102. As the IPSec tunnel is already established, the ePDG 103 is ready to transmit the WiFi calling service related traffic received from the UE 100 through the HTTP server 102 to the PGW for transmission to the PDN. The ePDG 103 receives the WiFi calling service related traffic as ESP payload from the UE 100 through the HTTP server 102. The ePDG 103 is also ready to transmit the WiFi calling service related traffic received from the PDN as ESP payload to the UE through the HTTP server 102. The following shows an exemplary embodiment of a possible interface description between the ePDG 103 and the HTTP server 102. The interface may be internal if ePDG 103 and HTTP server 102 are co-located.

| Message | Example information elements | Additional Information Elements | Description |
| --- | --- | --- | --- |
| Start | UE local IP address/UE identifier. NAS IP address WiFi calling service indicator | Start-request: WiFi calling service indicator, Location-information, UE local IP address, UE identity cookie (if re-login), start_response: result (attach state) | HTTP server 102 notifies ePDG 103 that UE 100 wants to start WiFi calling service, i.e. UE should be attached and IPSec tunnel established. NAS IP address is HTTP server address. |
| Online | UE local IP address/UE identifier/ NAS-IP | Cookie, result. | ePDG 103 notifies HTTP server 102 that IPSec tunnel is established and user is authenticated. |
| Transfer | UE local IP address/UE identifier/NAS-IP | IKE or IPSEC ESP data | IKE/IPSEC ESP data transferred between HTTP server 102 and ePDG 103. |

| Message | Example information elements | Additional Information Elements | Description |
|---|---|---|---|
| Info | UE local IP address/UE iedntifier/NAS-IP | Location-info | HTTP server 102 signals user location info to ePDG 103, when changed, or ePDG 103 gets user location info from HTTP server 102. |
| Offline | UE local IP address/UE iedntifier/NAS-IP | NULL | HTTP server 102 notifies ePDG 103 the release of the TLS transport. ePDG 103 may select to maintain or release the IPSec tunnel. |

FIG. 7 illustrates a schematic illustration of a protocol stack for control signaling between the UE 100, the HTTP server 102 and the gateway (e.g. ePDG) 103 according to an embodiment. The control signaling consists of the signaling used in the IKE authentication exchange to establish the IPSec tunnel for WiFi calling service. The embodiment shown in FIG. 7 illustrates IKE v2 protocol is carried over TLS to the HTTP server 102. The UE 100 encapsulates the IKE exchange messages in a TLS envelop. An embodiment of the TLS envelop is shown in FIG. 9. The HTTP server 102 in FIG. 7 removes the TLS encapsulation and relays the IKE message received from the UE 100 to the ePDG 103 using a UDP/IP interface or an internal interface if ePDG 103 is co-located with the HTTP server 102. The HTTP server 102 receives IKE messages from the ePDG 103 over the UDP/IP interface or internal interface, encapsulates the IKE message in a TLS encapsulation and relays the IKE message from the ePDG 103 to the UE 100 over TLS. It should be understood that instead of using TLS between the UE 100 and the HTTP server 102, UDP or other transport layers could also be used.

FIG. 8 illustrates a schematic illustration of a protocol stack for user plane traffic between the UE 100, the HTTP server 102 and the gateway (e.g. ePDG) 103 according to an embodiment. The user plane traffic consists of the WiFi calling service related traffic whether it is control signaling for establishment of the WiFi calling service (e.g., SIP) and the associated media traffic, i.e., voice and/or video real time protocol RTP, packets. The user plane traffic is transparent to the HTTP server 102 and ePDG 103. Similar to the control signaling of FIG. 7, the embodiment shown in FIG. 8 illustrates user plane traffic is carried as ESP payload over TLS between the UE 100 and the HTTP server 102. The UE 100 encapsulates the ESP payload in a TLS envelop. An embodiment of the TLS envelop is shown in FIG. 9. The HTTP server 102 in FIG. 8 removes the TLS encapsulation and relays the ESP payload received from the UE 100 to the ePDG 103 using a UDP/IP interface or an internal interface if ePDG 103 is co-located with the HTTP server 102. The ePDG 103 extracts the user plane traffic from the ESP payload prior to forwarding to the PGW for forwarding to the PDN. Similarly, when the ePDG 103 receives user plane traffic from the PGW, it encapsulates the traffic in ESP payload prior to forwarding to HTTP server 102 over the UDP/IP or internal interface. The HTTP server 102 applies a TLS encapsulation to the ESP payload prior to relaying to the UE 100 over TLS. The UE decapsulates the TLS and the ESP to extract the user plane traffic and forwards it to the corresponding application client. It should be understood that instead of using TLS between the UE 100 and the HTTP server 102, UDP or other transport layers could also be used. FIG. 8 is an exemplary protocol stack using TLS as a secure transport layer between the UE 100 and the HTTP server 102, however other transport layer methods could be used such as User Datagram Protocol, UDP, or Secure Socket Layer, SSL, etc.

In FIG. 8, the UE 100 has two addresses, address in bubble 1 corresponds to the local IP address assigned by the WLAN 101, and may be used to route internet traffic through the WLAN 101, while the address in bubble 2 corresponds to the IP address assigned by the PGW during IPSec tunnel establishment with the EPC. The address assigned by the PGW is used to access the WiFi calling service in the PDN.

FIG. 9 illustrates an embodiment for a TLS envelop used to encapsulate the authentication exchange and the ESP payload between the UE 100 and the HTTP server 102. The TLS envelop embodiment illustrated in FIG. 9 shows 11. T_header which consists of
   a. PD (protocol discriminator) octet used to distinguish between IKE/IPSec data and the HTTP protocol data.
   b. 2 octets for the length field indicates the length of TLS envelope in octets.
   c. Message type field in octet 5 indicates whether the payload in the TLS envelop is IKE exchange protocol, IPSEC ESP protocol or IKE keep-alive message.
      i. Value=0 denote IKE exchange protocol.
      ii. Value=0xff denote IKE-alive message. For this message type there is no message content in T_envelop.
      iii. Other value: denote IPSec ESP payload.

Other TLS envelop formats may be used. The result of using any possible TLS envelop format is to arrive to an encapsulation by TLS of the IKE protocol and ESP payload. As such, any possible format TLS encapsulation of IKE and ESP payload are covered by this disclosure.

FIG. 10 illustrates an exemplary embodiment an HTTP server comprising a circuitry 60 which executes the method steps according to the embodiments as described in FIG. 3 and FIG. 4 along with steps 112, 113a-113b, 114-116, 116b, 117-121 of FIG. 1 and FIG. 2 in addition to other embodiments described herein. In one embodiment, the circuitry 60 may comprise a processor 61 and a storage 62 (also referred to as memory) containing instructions, which when executed, cause the processor 61 to perform the steps in a method according to embodiments described herein. The circuitry 60 may further comprise a communication interface 63 to communicate with external entities such as with UE using interfaces such as the interfaces illustrated in FIGS. 7 and 8 and other embodiments herein, and with ePDG using interfaces illustrated in FIGS. 7 and 8 and other embodiments herein. Additionally the communication interface 63 may be used to communicate authorization to the WLAN to open the gate for local routing of the UE internet traffic. Note that the HTTP server 102 may at any time send instructions to close the gate for local routing of the UE internet traffic. The closing of gate instructions may be triggered by the mobile operator's policy.

FIG. 11 illustrates an exemplary embodiment of a circuitry 70 in a UE comprising a processing module 71 configured to send a HTTPS request over the communication module 73 for logging into a HTTP server over the WLAN, the HTTPS request comprising a WiFi calling service indicator, where WiFi calling service corresponds to real-time communication, RTC, service such as voice over IP and/or video over IP. The processing module 71 is further configured to receive over the communication module 73 an HTTPS response comprising information related to the attach state of the UE and determines if the information related to the attach state of the UE comprises an indication that the UE should attach to the network over the communication module 71 in which case, the processing module 71 triggers a UE attach procedure in order to establish establishment an IPSec tunnel instance. If however, the processing module 71 in the UE determines that the information related to the attach state of the UE comprises an indication that the UE is already logged-in to the HTTP server and is already attached with a valid IPSec tunnel, the processing module 71 of the UE can start sending and receiving over the communication module 73 the IPSec payload associated with the WiFi calling service. Further, the processing module 71 stores in the storage module 72 the information related to the attach state of the UE and state information related to the established IPSec tunnel.

The circuitry 70 in FIG. 11 further comprises the communication module 73 configured to send and receive HTTPS messages to and from the HTTPS server and messages related to the UE attach procedure for establishment of an IPSec tunnel (i.e., authentication exchange such as IKE exchange messages) as well as transmitting the ESP payload over the established IPSec tunnel. The circuitry 70 further comprises the storage module 72 configured to maintain the information related to the attach state of the UE (such as the login and the attach state of the UE, a cookie if one is received, the ePDG address if one is received and possibly location information). The storage module 72 also maintains state information related to the IPSec tunnel (e.g., security associations).

A person skilled in the art would understand that the modules can be implemented as a computer program running on a processor and that the modules are operative to execute the steps of the previously described method.

The invention has been described with reference to particular embodiments. However, it will be readily apparent to those skilled in the art that it is possible to embody the invention in specific forms other than those of the embodiments described above. The described embodiments are merely illustrative and should not be considered restrictive in any way. The scope of the invention is given by the appended claims, rather than the preceding description, and all variations and equivalents that fall within the range of the claims are intended to be embraced therein.

What is claimed is:

1. A method for connecting a User Equipment (UE) to a gateway over a secure tunnel, over a managed wireless local access network (WLAN) for real-time communication (RTC) services, the method executed at a server, the method comprising:
   receiving over the WLAN a secure HyperText Transfer Protocol (HTTPS) request from the UE for logging into the server for the RTC services, the HTTPS request comprising an RTC service indicator;
   sending a first message to the gateway to determine a UE attach state for the RTC services and receiving back a first response from the gateway indicative of the UE attach state;
   sending a HTTPS response to the UE, the HTTPS response comprising information related to the UE attach state for the RTC services at the gateway and login state at the server;
   upon determining that the UE is not attached for the RTC services, performing a UE attachment; and
   upon determining that the UE is attached for the RTC services and an Internet Protocol Security (IPSec) tunnel instance is established between the UE and the gateway;
      receiving a second message from the gateway indicative of the UE being authenticated by the gateway and the IPSec tunnel being live for the UE, the second message being a common authentication for using the IPSec tunnel for the RTC services and for routing UE internet traffic directly over the WLAN;
      receiving and relaying IPSec payload for the RTC services between the UE and the gateway through the IPSec tunnel; and
      sending an authentication message authorizing the WLAN to route the UE internet traffic directly over the WLAN.

2. The method of claim 1, wherein the HTTPS request comprises at least one of UE location information and a local Internet Protocol (IP) address assigned to the UE by the WLAN.

3. The method of claim 1, wherein the HTTPS request comprises a previous cookie from a previous UE attach.

4. The method of claim 1, wherein the first message to the gateway comprises at least one of a previous cookie from a previous UE attach, UE location information, and a local Internet Protocol (IP) address assigned to the UE by the WLAN.

5. The method of claim 1, wherein performing the UE attachment further comprises:
   receiving over the WLAN a second HTTPS request for the RTC services from the UE, the second HTTPS request comprising the RTC service indicator and a UE attach indicator;
   receiving and relaying an authentication exchange between the UE and the gateway for establishment of the IPSec tunnel; and
   upon receiving a notification from the gateway that the IPSec tunnel is established, sending a second HTTPS response message to the UE, the second HTTPS response message comprising an indication of a successful attach to the gateway and successful login to the server.

6. The method of claim 5, wherein the notification from the gateway comprises a cookie.

7. The method of claim 5, wherein receiving and relaying the authentication exchange and the IPSec payload between the UE and the gateway further comprises encapsulating, in a Transport Layer Security (TLS) attribute, the authentication exchange and the IPSec payload as received from the gateway for forwarding to the UE and decapsulating the received TLS attribute from the UE to extract the authentication exchange and the IPSec payload for forwarding to the gateway.

8. The method of claim 7, wherein the authentication exchange is an Internet Key Exchange (IKE) protocol.

9. The method of claim 1, wherein determining that the UE is attached and the IPSec tunnel is established further comprises receiving a response from the gateway indicating that the UE is already attached and a valid IPSec tunnel already exists at the gateway.

10. The method of claim 9, wherein the response from the gateway comprises an updated cookie indicating that the valid IPSec tunnel for the RTC services already exists for the UE at the gateway.

11. The method of claim 1, wherein the server and the gateway are co-located.

12. The method of claim 1, wherein the IPSec tunnel instance is exclusively used for RTC related traffic.

13. A method for connecting a User Equipment (UE) to a gateway over a secure tunnel, over a managed wireless local access network (WLAN) for real-time communication (RTC) services, the method executed at the UE, the method comprising:
   sending over the WLAN a secure HyperText Transfer Protocol (HTTPS) request for logging to a server for the RTC services, the HTTPS request comprising an RTC indicator;
   receiving an HTTPS response, the HTTPS response comprising information related to an attach state of the UE;
   upon determining that the information related to the attach state of the UE comprises an indication for the UE to attach for the RTC services, triggering a UE attach procedure for establishment of an Internet Protocol Security (IPSec) tunnel; and
   upon determining that the information related to the attach state of the UE comprises an indication that the UE is logged-in to the server and attached with a valid IPSec tunnel;
   receiving a notification message indicative of the UE being authenticated by the gateway, the notification message being a common authentication for using the IPSec tunnel for the RTC services and for routing UE internet traffic directly over the WLAN;
   sending and receiving IPSec payload for the RTC services through the IPSec tunnel; and
   sending and receiving the UE internet traffic directly over the WLAN.

14. The method of claim 13, wherein the HTTPS request comprises at least one of UE location information and a local Internet Protocol (IP) address assigned to the UE by the WLAN.

15. The method of claim 13, wherein the HTTPS request comprises a previous cookie received from a previous UE attach.

16. The method of claim 13, wherein triggering the UE attach procedure for establishment of the IPSec tunnel further comprises:
   sending over the WLAN a second HTTPS request for the RTC services, the second HTTPS request comprising a UE attach indication;
   sending and receiving an authentication exchange for establishment of the IPSec tunnel; and
   receiving a response message to the second HTTPS request, the response message comprising result of the UE attach procedure and login state at the server.

17. The method of claim 16, wherein the response message comprises a cookie for use in subsequent re-login.

18. The method of claim 16, wherein sending and receiving the authentication exchange and the IPSec payload between the UE and the gateway further comprises encapsulating, in a Transport Layer Security (TLS) attribute, the authentication exchange and the IPSec payload for forwarding to the gateway and decapsulating the received TLS attribute to extract the authentication exchange and the IPSec payload.

19. A method for connecting a User Equipment (UE) to a gateway over a secure tunnel, over a managed wireless local access network (WLAN) for real-time communication (RTC) services, the method executed at the gateway, the method comprising:
   receiving a request to start the RTC services for the UE;
   determining a UE attach status for the RTC services; and
   upon determining that the UE attach status indicates that the UE is already attached and a valid Internet Protocol Security (IPSec) tunnel already exists for the UE;
   sending a response indicating that the UE is attached, else sending a response instructing the UE to attach for establishment of an IPSec tunnel;
   sending a message indicative of the UE being authenticated by the gateway and the IPSec tunnel being live for the UE, the message being a common authentication for using the IPSec tunnel for the RTC services and for routing UE internet traffic directly over the WLAN; and
   authorizing the WLAN to route the UE internet traffic directly over the WLAN.

20. The method of claim 19, wherein the request further comprises at least one of a cookie from a previous UE attach, a local Internet Protocol (IP) address assigned to the UE by the WLAN, and UE location information.

21. The method of claim 20, wherein the at least one of the cookie and the local IP address assigned to the UE by the WLAN is used in determining the attach status of the UE.

22. The method of claim 19, wherein sending the response indicating that the UE is attached for the RTC services corresponds to sending a response comprising an updated cookie.

23. A server configured to connect a User Equipment (UE) to a gateway over a secure tunnel, over a managed wireless local access network (WLAN) for real-time communication (RTC) services, the server comprising a circuitry to:
   receive over the WLAN a secure HyperText Transfer Protocol (HTTPS) request from the UE for logging into the server for the RTC services, the HTTPS request comprising an RTC service indicator;
   send a first message to the gateway to determine a UE attach state for the RTC services and receive back a first response from the gateway indicative of the UE attach state;
   send a HTTPS response to the UE, the HTTPS response comprising information related to the UE attach state for the RTC services at the gateway and login state at the server;
   upon determining that the UE is not attached for the RTC services, perform a UE attachment; and
   upon determining that the UE is attached for the RTC services and an Internet Protocol Security (IPSec) tunnel instance is established between the UE and the gateway;
   receive a second message from the gateway indicative of the UE being authenticated by the gateway and the IPSec tunnel being live for the UE, the second message being a common authentication to use the IPSec tunnel for the RTC services and to route UE internet traffic directly over the WLAN;
   receive and relay IPSec payload for the RTC services between the UE and the gateway through the IPSec tunnel; and send an authentication message authorizing the WLAN to route the UE internet traffic directly over the WLAN.

24. The server of claim 23, wherein the circuitry comprises a processor, a communication interface, and a memory, the memory containing instructions executable by the processor.

25. A User Equipment (UE) configured to connect to a gateway over a secure tunnel, over a managed wireless local access network (WLAN) for real-time communication (RTC) services, the UE comprising a circuitry configured to:
send over the WLAN a secure HyperText Transfer Protocol (HTTPS) request for logging to a server for the RTC services, the HTTPS request comprising an RTC service indicator;
receive an HTTPS response, the HTTPS response comprising information related to an attach state of the UE;
upon determining that the information related to the attach state of the UE comprises an indication for the UE to attach, trigger a UE attach procedure for establishment of an Internet Protocol Security (IPSec) tunnel; and
upon determining that the information related to the attach state of the UE comprises an indication that the UE is logged-in to the server and attached with a valid IPSec tunnel;
receive a notification message indicative of the UE being authenticated by the gateway, the notification message being a common authentication to use the IPSec tunnel for the RTC services and to route UE internet traffic directly over the WLAN;
send and receive IPSec payload for the RTC services through the IPSec tunnel; and
send and receive the UE internet traffic directly over the WLAN.

* * * * *